Patented July 25, 1939

2,167,434

UNITED STATES PATENT OFFICE 2,167,434

VAT DYESTUFF OF THE ANTHRAQUINONE SERIES AND PROCESS FOR PRODUCING THE SAME

Donald P. Graham, South Milwaukee, Wis., assignor to E. I. du Pont de Nemours & Company, Wilmington, Del., a corporation of Delaware No Drawing. Application April 22, 1935, Serial No. 17,677

4 Claims. (Cl. 260—316)

This invention relates to the preparation of a new olive dyestuff of the anthraquinone series, and the intermediate formed in its preparation. More particularly, it relates to the process of, and products resulting from, the condensation of alpha-trichloro-anthraquinone with three moles of alpha-amino-anthraquinone, and the fusion of the tetranthrimide so formed with aluminum chloride, to produce a dyestuff of the class generally referred to as anthrimide-carbazoles.

According to my invention, alpha-trichloro-anthraquinone is condensed with three moles of alpha-amino-anthraquinone by the well-known Ullmann reaction, in a solvent such as nitrobenzene, in the presence of copper, a copper salt, and sodium carbonate, or acetate (anhydrous). The alpha-trianthraquinonylamino-anthraquinone or tetranthrimide is then fused with aluminum choride preferably in the presence of a substance which operates as a diluent or flux, with simultaneous or subsequent oxidation of the dyestuff so formed.

The alpha-trichloro-anthraquinone may be prepared by any method known to the prior art, such as by the treatment of 1,5-dichloro-anthraquinone-8-sodium sulfonate with hydrochloric acid and sodium chlorate; by the direct chlorination of 1,5-dichloro-anthraquinone in weak oleum; by the chlorination of 1,5-dichloro-anthraquinone in a mixture of antimony trichloride and antimony pentachloride; or by the mononitration of 1,5-dichloro- or 1,8-dichloro-anthraquinone and the subsequent replacement of the nitro group with chlorine.

The following examples are given to more fully illustrate my invention. Parts used are by weight.

Example 1

A mixture of 31 parts of 1,4,5-trichloro-anthraquinone, 67 parts of alpha-amino-anthraquinone, 20 parts of soda ash, 5 parts of copper acetate and 0.5 part of copper powder is slurried in 500 parts of nitrobenzene and heated to 200–210° C. and held for 3 hours. It is then cooled to 80°, filtered and washed with 50 parts of nitrobenzene, followed by 200 parts of alcohol. The cake is slurried in hot water and acidified with hydrochloric acid. It is filtered, washed acid free, and dried.

Example 2

5 parts of alpha-trianthraquinonylamino-anthraquinone, which may be obtained by the process outlined in Example 1, is mixed with 6 parts of sodium carbonate and 45 parts of ground aluminum chloride. The charge is then heated gradually in an open vessel until the mass is molten and at a temperature of approximately 180° C. The mass is well agitated and held on temperature as long as the foaming continues. It is then drowned, filtered, and the cake washed acid free. When the fusion is conducted in this manner, there is little or no material left in the reduced state as oxidation takes place during the progress of the fusion. However, brighter shades are obtained if the product is further oxidized by slurrying in dilute sulfuric acid with sodium dichromate at 80–100° for one hour or more.

The product is then filtered off and washed acid free. It is a dark olive solid giving a red-brown to violet-brown solution in sulfuric acid. It dyes cotton in olive shades from a red-brown vat. The product may be put in suitable paste form by vatting and reoxidation.

Example 3

1 part of alpha-trianthraquinonylamino-anthraquinone intimately mixed with 0.3 to 0.7 part of soda ash is added slowly to a melt of 8 to 15 parts of aluminum chloride and 0.8 to 1.2 parts of sodium chloride at a temperature of 180–190°. After the addition of the trianthraquinonylamino-anthraquinone, the charge is held at 180–190° for a few minutes and then drowned in 30 to 60 parts of water, filtered and washed; the cake is then slurried in about 50 parts of 10–20% sulfuric acid and about 1 part of sodium dichromate is added. The charge is heated to 90° and held at 90–95° for about five hours. An excess of dichromate is maintained by further additions if necessary. When the oxidation is completed, the charge is filtered and washed acid free.

The product obtained as described is essentially similar to that described in Example 1, although in a somewhat purer form.

As disclosed in the above examples, a flux, such as an alkali-metal chloride or carbonate which in the reaction is converted to the chloride, may be used with the aluminum chloride to maintain the mass in a molten state at the temperatures used. The metal carbonate also serves in the reaction to effect local agitation, thereby causing the reaction to take place in a smooth and uniform manner.

Under certain conditions of the fusion, such as when air is intimately mixed with the fusion mass by agitating in a relatively large reaction vessel, the oxidation takes place simultaneously with the fusion. We prefer, however, to drown the fusion mass, filter off the crude color, and oxidize the product with oxidizing agents such as sodium dichromate and sulfuric acid. Such oxidation eliminates some of the impurities and produces a brighter and more desirable dyestuff. Other oxidizing agents may of course be used, such as hypochlorites in alkaline solution, chlorine in dilute acids, sodium nitrite, etc.

The aluminum chloride fusion of the trianthraquinonylamino-anthraquinone may be carried out at temperatures above 175° C., but preferably not above 210°. Higher temperatures, while operable, tend to give a less pure product.

I claim:

1. The aluminum chloride fusion product of 1,4,5-trianthraquinonylamino-anthraquinone.

2. The olive vat dyestuff obtainable by fusing 1,4,5 - trianthraquinonylamino - anthraquinone with aluminum chloride in the presence of an alkali-metal chloride, with subsequent oxidation of the resulting ring-closed product in dilute sulfuric acid with an alkali-metal dichromate.

3. The process which comprises condensing one mole of 1,4,5-trichloroanthraquinone with three moles of alpha-aminoanthraquinone in the presence of soda ash and a copper catalyst in nitrobenzene, and subjecting the resulting 1,4,5-trianthraquinonylaminoanthraquinone to a fusion with aluminum chloride in the presence of an alkali-metal chloride, at temperatures of 175 to 210° C.

4. In the process for preparing an olive dyestuff of the anthraquinone series, the step which comprises fusing 1,4,5 - trianthraquinonylaminoanthraquinone with aluminum chloride in the presence of a flux of the class consisting of alkali-metal chlorides and alkali-metal carbonates, at temperatures of 175 to 210° C.

DONALD P. GRAHAM.